(12) United States Patent
Lee et al.

(10) Patent No.: US 8,189,349 B2
(45) Date of Patent: May 29, 2012

(54) HANDHELD ELECTRONIC DEVICE WITH LARGE SPREADING AREA

(75) Inventors: Ying-Xing Lee, Taoyuan County (TW); Chien-Wei Huang, Taoyuan County (TW); I-Cheng Chuang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 207 days.

(21) Appl. No.: 12/690,077

(22) Filed: Jan. 19, 2010

(65) Prior Publication Data

US 2011/0063807 A1 Mar. 17, 2011

(30) Foreign Application Priority Data

Sep. 11, 2009 (TW) ................................ 98130802 A

(51) Int. Cl.
*H04B 1/03* (2006.01)
(52) U.S. Cl. ........................................................ 361/814
(58) Field of Classification Search .................. 361/814, 361/679.01, 679.02, 727, 730
See application file for complete search history.

(56) References Cited

U.S. PATENT DOCUMENTS

| | | |
|---|---|---|
| 2009/0027836 A1 | 1/2009 | Wakihara |
| 2009/0116200 A1 | 5/2009 | Yeh |
| 2009/0147451 A1 | 6/2009 | Yeh |
| 2009/0147453 A1 | 6/2009 | Hsieh et al. |
| 2009/0147484 A1 | 6/2009 | Chuang et al. |

FOREIGN PATENT DOCUMENTS

| | | |
|---|---|---|
| EP | 2009972 | 12/2008 |
| TW | M352874 | 3/2009 |
| TW | 200926735 | 6/2009 |

OTHER PUBLICATIONS

"Search Report of European Counterpart Application" issued on May 7, 2010, p. 1-p. 3.
"Office Action of European Counterpart Application" issued on May 28, 2010, p. 1-p. 7.
"Office Action of Taiwan Counterpart Application", issued on Oct. 17, 2011, p. 1-p. 6.

*Primary Examiner* — Jeremy Norris
*Assistant Examiner* — Tremesha S Willis
(74) *Attorney, Agent, or Firm* — Jianq Chyun IP Office

(57) ABSTRACT

A handheld electronic device including a first body, a second body, a sliding module, and a shielding member is provided. The sliding module drives the first body and the second body transforming between a retracting state and a spreading state. The sliding module includes a sliding member, a fixing member and a driving member. The sliding member has an opening and when the first body and the second body configure in the spreading state, a part of the opening is exposed. The shielding member is coupled to the driving member. When the first body and the second body are transformed from the retracting state to the spreading state, the driving member drives the shielding member sliding with respect to the sliding member to shield the part of the opening.

8 Claims, 6 Drawing Sheets

HANDHELD ELECTRONIC DEVICE WITH LARGE SPREADING AREA

CROSS-REFERENCE TO RELATED APPLICATION

This application claims the priority benefit of Taiwan application serial No. 98130802, filed on Sep. 11, 2009. The entirety of the above-mentioned patent application is hereby incorporated by reference herein and made a part of this specification.

BACKGROUND OF THE INVENTION

1. Field of the Invention

The present application relates to an electronic device, and more particularly, to a handheld electronic device.

2. Description of Related Art

With an advancement of the technology, human beings tend to rely on electronic device to a greater degree. To meet the requirement of a light, thin, compact and high performance handheld electronic device, various handheld electronic device, such as ultra mobile personal computer (UMPC), tablet PC, pocket PC, personal digital assistant (PDA) and cell phone, are provided.

Conventional handheld electronic devices usually adopt a clamshell-type design or a sliding-type design. Regarding to the sliding-type design, a display screen and a keyboard are respectively disposed on the two stacked bodies for users to operate, wherein a flexible printed circuit (FPC) is used to electrically connect the two bodies.

The existing design forms openings on the bodies or the sliding module to make the flexible printed circuit move smoothly between the bodies. However, since the flexible printed circuit is connected between the two bodies, the two bodies should maintain stacked partly with each other to protect the flexible printed circuit spread from a retracting state. In other words, available space of the conventional handheld electronic device is limited due to the restriction of the spreading area of the two bodies, and accordingly the structural design of the handheld electronic device is also restricted.

On the other hand, increasing the spreading area of the two bodies causes the opening being enlarged and the flexible printed circuit being exposed and affects the exterior design of the handheld electronic device. In addition, the flexible printed circuit may be pulled out in using and the reliability is reduced.

SUMMARY OF THE INVENTION

The present application provides a handheld electronic apparatus for larger spreading area, artistic exterior design, and superior reliability.

A handheld electronic device including a first body, a second body, a sliding module, and a shielding member is provided in an embodiment of the present invention. The sliding module is disposed between the first and second bodies to drive the first body and the second body transforming between a retracting state and a spreading state. The sliding module includes a sliding member, a fixing member and a driving member. The fixing member is disposed on the second body. The sliding member is disposed on the first body and slidably coupled to the fixing member. The driving member is connected between the second body and the sliding member. The sliding member has an opening and when the first body and the second body configure in the spreading state, a part of the opening is exposed. The shielding member is coupled to the driving member. When the first body and the second body are transformed from the retracting state to the spreading state, the driving member drives the shielding member sliding with respect to the sliding member to shield the part of the opening.

Accordingly, in the above embodiment of the invention, the part of the opening exposed after the handheld electronic device is spread is covered by the shielding member to protect the flexible electrical connecting member in the handheld electronic device, which permits the two bodies of the handheld electronic device providing larger spreading area, providing artistic exterior design, and improving reliability.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1A:
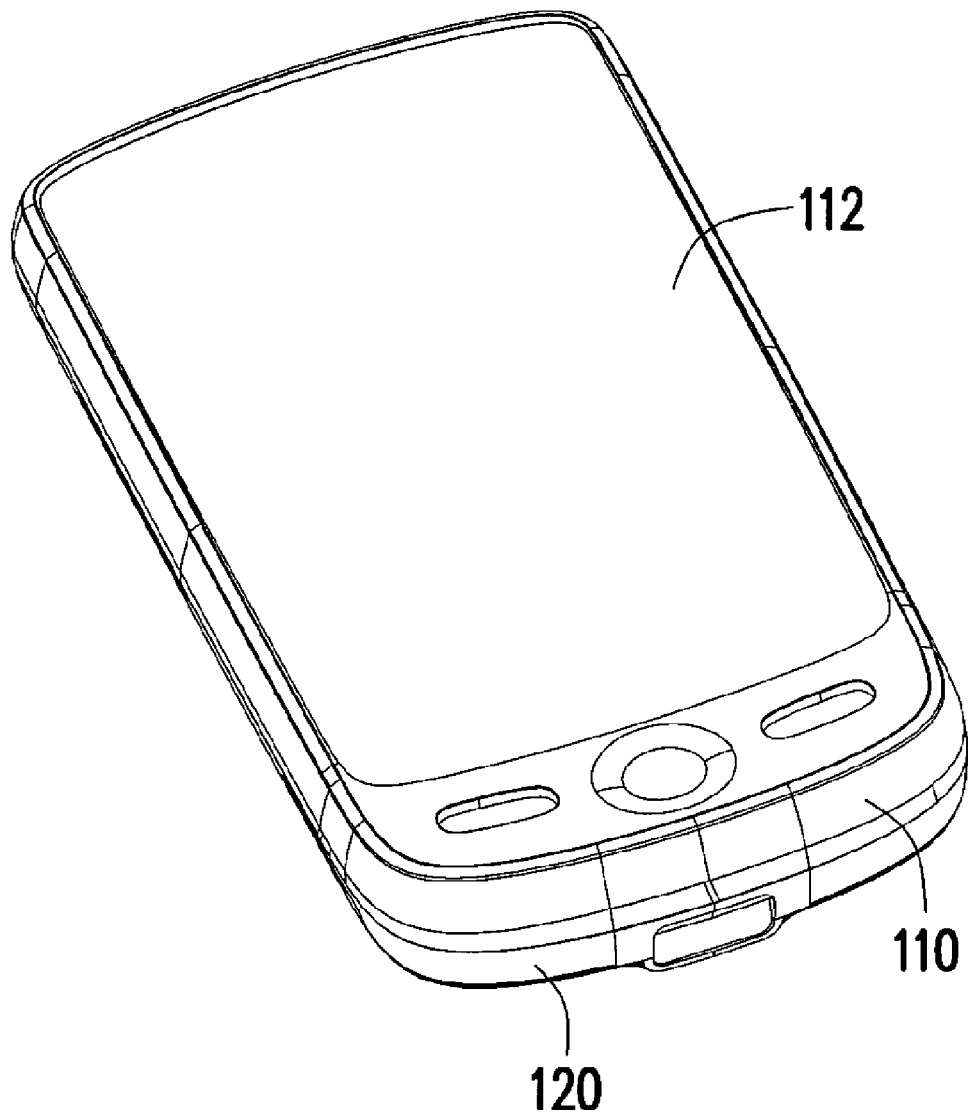
FIG. 1A is a schematic drawing showing a handheld electronic device in a retracting state according to an embodiment of the present invention.
Figure 1B:
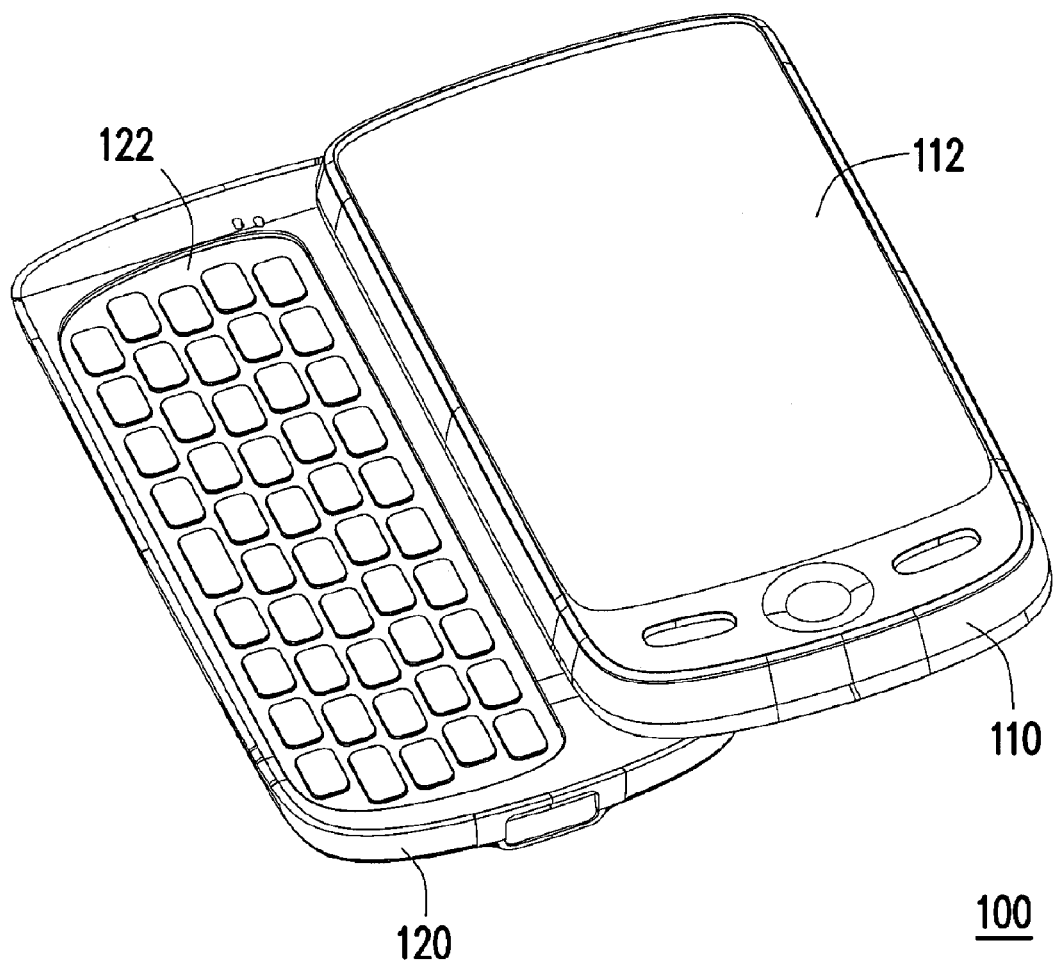
FIG. 1B is a schematic drawing showing the handheld electronic device of FIG. 1A in a spreading state.
Figure 2:
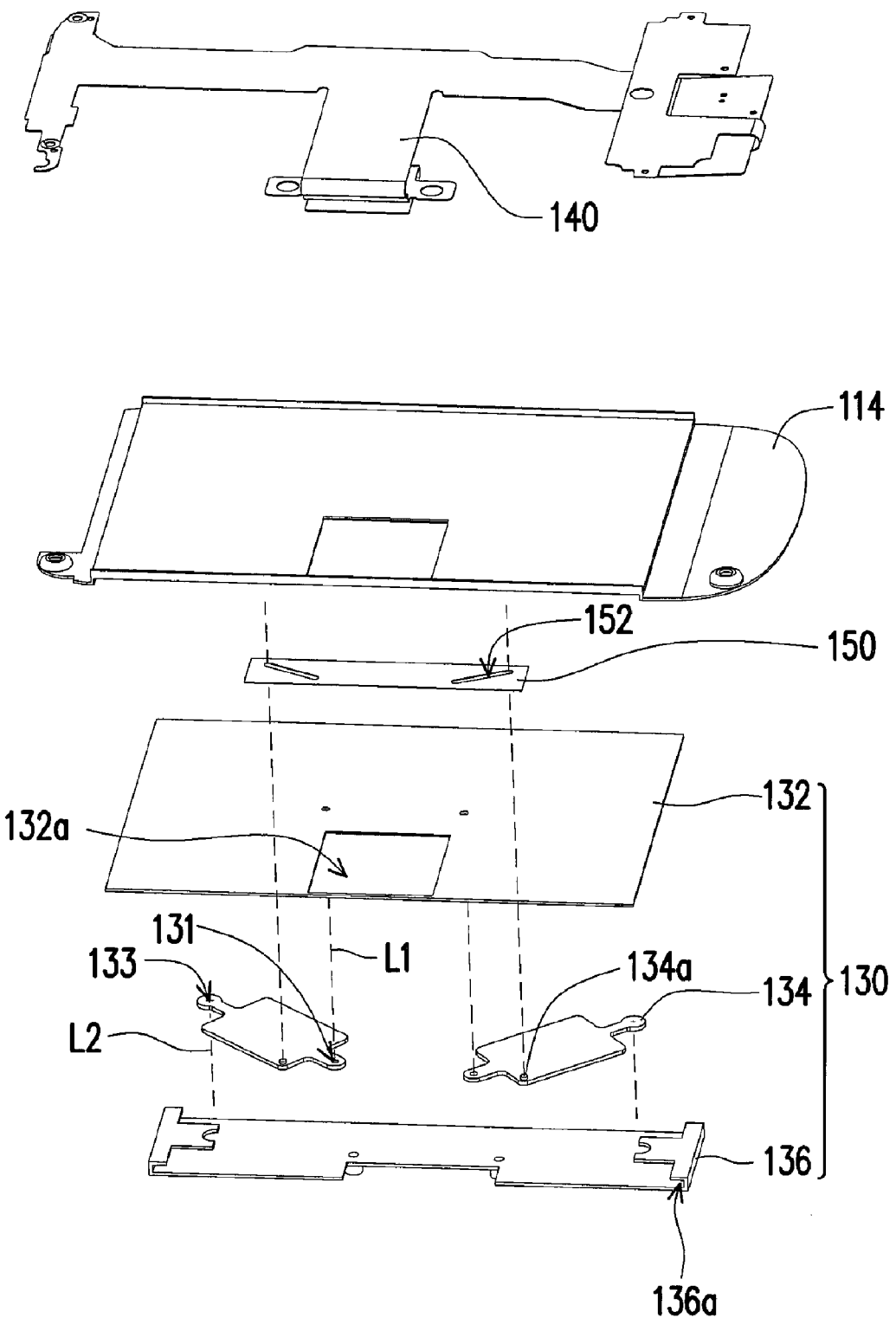
FIG. 2 is an exploded diagram of a part of components of the handheld electronic device of FIG. 1A.
Figure 3:
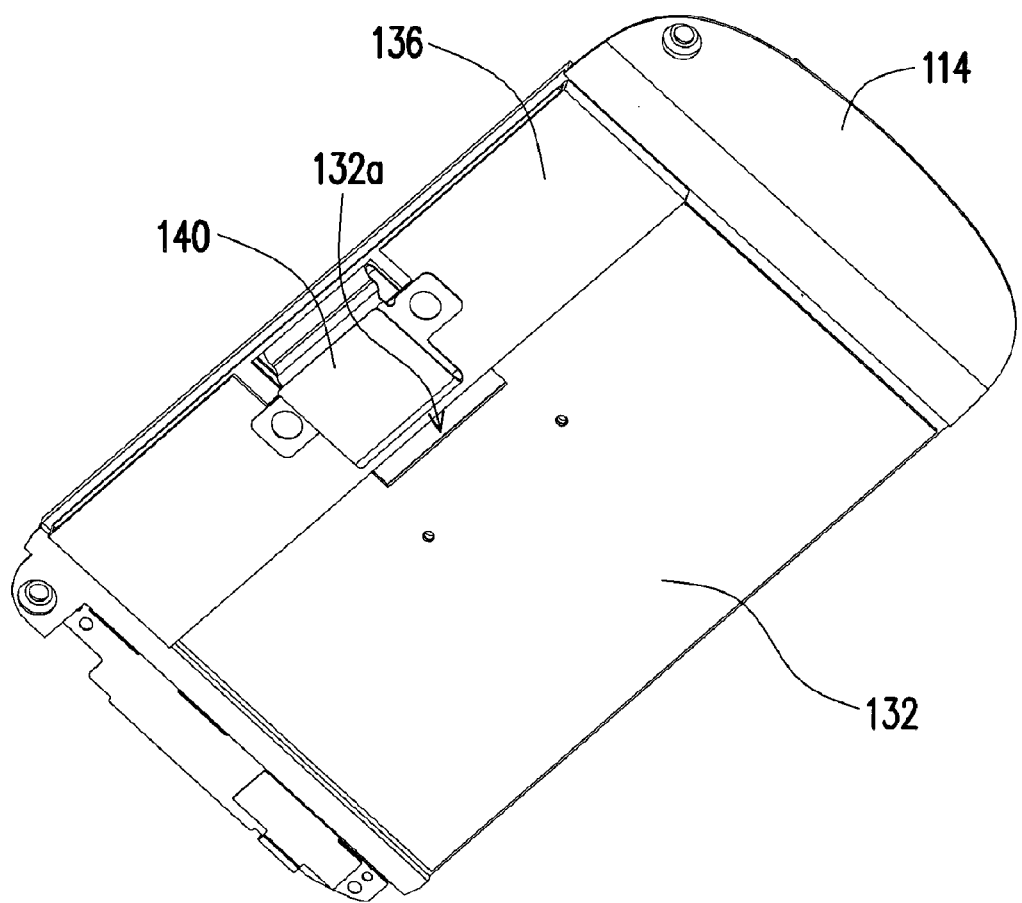
FIG. 3 is an assembled diagram of the part of components of the handheld electronic device of FIG. 2.

FIG. 1A is a schematic drawing showing a handheld electronic device in a retracting state according to an embodiment of the present invention. FIG. 1B is a schematic drawing showing the handheld electronic device of FIG. 1A in a spreading state. FIG. 2 is an exploded diagram of a part of components of the handheld electronic device of FIG. 1A. FIG. 3 is an assembled diagram of the part of components of the handheld electronic device of FIG. 2. Referring to FIGS. 1A, 1B and 2, in the present embodiment, the handheld electronic device 100 includes a first body 110, a second body 120, a sliding module 130 and a flexible electrical connecting member 140. In this embodiment, the first body 110 has a display interface 112, such as a display screen, and the second body 120 has an input interface 122, such as a keyboard.

Referring to FIGS. 2 and 3, in this embodiment, the first body 110 includes a metal plate 114, and the sliding module 130 is dispose between the metal plate 114 and the second body 120, so that the first body 110 and the second body 120 can be transformed between the retracting state of FIG. 1A and the spreading state of FIG. 1B. When the first body 110 and the second body 120 are in the retracting state, the input interface 122 is covered by the first body 110. Otherwise, when the first body 110 and the second body 120 are in the spreading state, the input interface 122 is exposed outside the first body 110 and the second body 120.

The sliding module 130 includes a sliding member 132, a fixing member 136 and one or more driving members 134. This embodiment takes two driving members 134 as an example. The fixing member 136 is disposed on the second body 120, and the sliding member 132 is disposed on the first body 110 and slidably coupled to the fixing member 136, wherein the sliding member 132 has an opening 132a. Specifically, the fixing member 136 has a pair of sliding slots 136a, and two opposite edges of the sliding member 132 are slidably engaged in the pair of sliding slots 136a. The flexible electrical connecting member 150 is for example a flexible printed circuit board, passing through the opening 132a and being connected between the first body 110 and the second body 120. The driving members 134 are connected between the fixing member 136 and the sliding member 132.

When the first body 110 and the second body 120 configure in the spreading state, a part of the opening 132a is exposed, and accordingly the flexible electrical connecting member 140 is also exposed via the exposed part of the opening 132a.

Figure 4A:
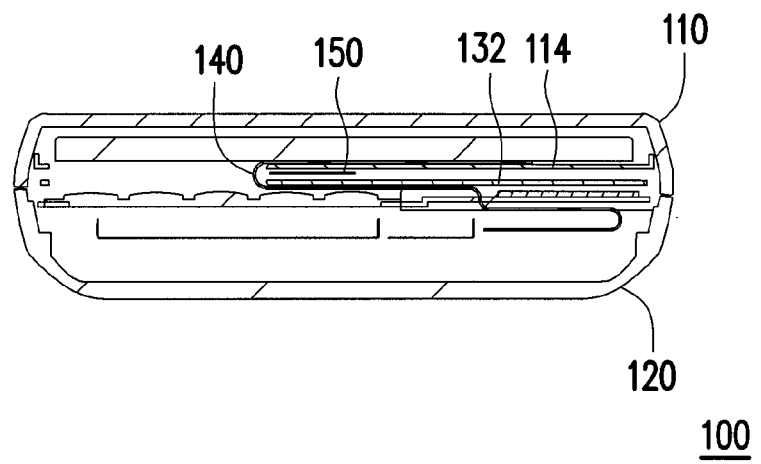
FIGS. 4A and 4B are cross-sectional views of the handheld electronic device of FIGS. 1A and 1B.
Figure 4B:
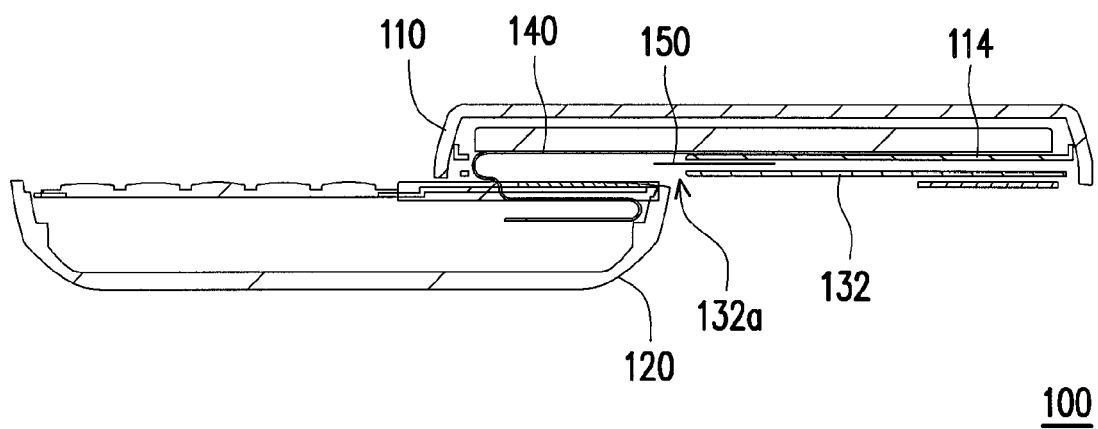

FIGS. 4A and 4B are cross-sectional views of the handheld electronic device of FIGS. 1A and 1B. Referring to FIGS. 2, 4A and 4B, the handheld electronic device 100 further includes a shielding member 150 coupled to the driving members 134. When the first body 110 and the second body 120 are transformed from the retracting state to the spreading state, the driving member 134 drives the shielding member 150 sliding with respect to the sliding member 132 to shield the part of the opening 132a.

In view of the above, the shielding member 150 is capable of providing superior protection and shielding effect to the flexible electrical connecting member 140 which may be exposed during the operation process of the handheld electronic device 100, and therefore improves artistic exterior design and reliability of the handheld electronic device 100. Furthermore, the above design permits larger spreading area of the first body 110 and the second body 120, and thereby more available space of the handheld electronic device 100 is released.

In this embodiment, the driving members 134 are, for example, a plurality of elastic modules. By which, when the first body 110 is driven by an external force to slide with respect to the second body 120, the driving members 134 provides a driving force to semi-automatically push the first body 110 away from the second body 120, or semi-automatically draw the first body 110 back to the second body 120 to achieve the retracting state.

In this embodiment, each driving member 134 has a guiding pin 134a, and the shielding member 150 is provided with sliding slots 152 corresponding to the guiding pins 134a, wherein the guiding pins 134a are slidably disposed in the sliding slots 152. When the sliding member 132 slides with respect to the fixing member 136, the shielding member 150 is driven to move with respect to the sliding member 132 by the coupling of the sliding slots 152 and the guiding pins 134a.

Figure 5A:
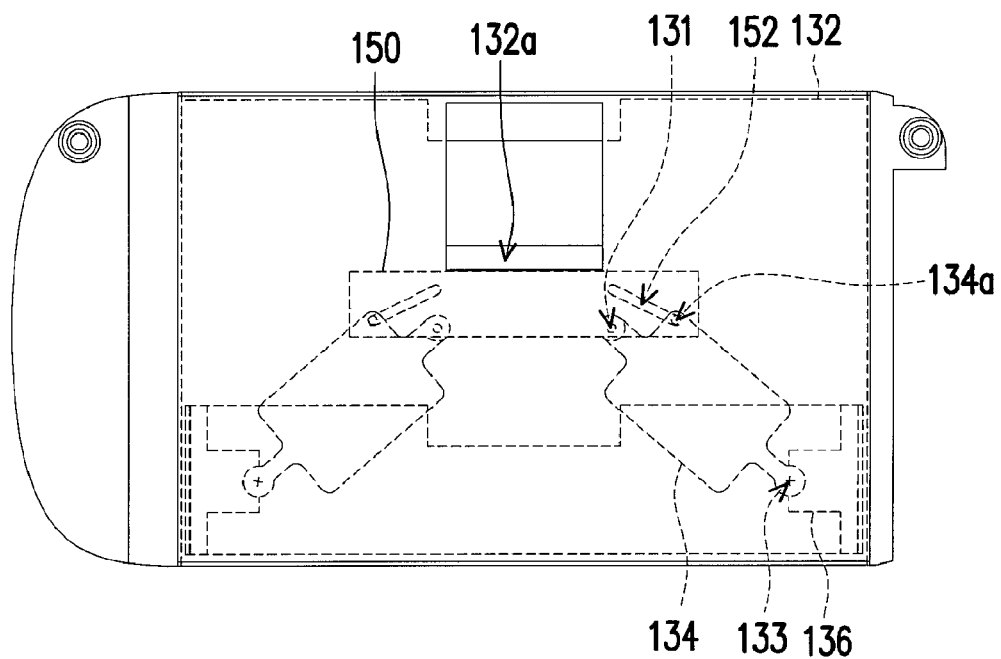
FIGS. 5A and 5B are schematic drawings respectively showing the operation of a sliding module according to an embodiment of the present invention.
Figure 5B:
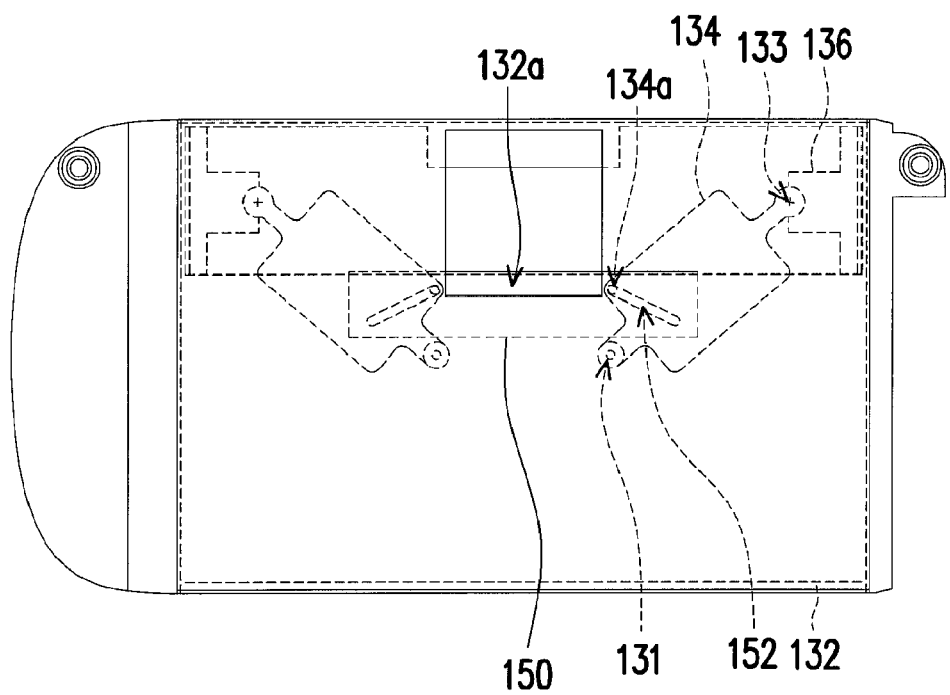

FIGS. 5A and 5B are schematic drawings respectively showing the operation of a sliding module according to an embodiment of the present invention. Referring to FIGS. 2, 4A, 4B, 5A and 5B, it is noted that each of the driving members 134 has a first end 131 and a second end 133. The first end 131 is pivoted on the sliding member 132 along a first axis L1. The second end 133 is pivoted on the fixing member 136 along a second axis L2. In addition, a projection of each guiding pin 134a perpendicularly projected to a straight line passing through the corresponding first axis L1 and the second axis L2 is situated between the first axis L1 and the second axis L2. Therefore, the driving members 134 drive the shielding member 150 moving when the sliding member 132 slides with respect to the fixing member 136.

In summary, the handheld electronic device is provided with a movable shielding member, which is capable of shielding the exposed flexible electrical connecting member when the handheld electronic device is in a spread state, and thereby provides superior protection to the flexible electrical connecting member and improves artistic exterior design and reliability of the handheld electronic device.

On the other hand, the movable shielding member provides shielding effect to the flexible electrical connecting member so as to resolve the problem that the flexible electrical connecting member is exposed as excessively spreading the two bodied of the handheld electronic device. Therefore, more available design space of the handheld electronic device is released and higher design flexibility is provided.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:

1. A handheld electronic device, comprising:
   a first body;
   a second body;
   a sliding module, disposed between the first and second bodies to drive the first body and the second body transforming between a retracting state and a spreading state, the sliding module comprising:
      a sliding member, disposed on the first body, wherein the sliding member has an opening and when the first body and the second body are configured in the spreading state, a part of the opening is exposed;
      a fixing member, disposed on the second body, wherein the sliding member is slidably coupled to the fixing member;
      a driving member, connected between the fixing member and the sliding member; and
   a shielding member, coupled to the driving member, wherein when the first body and the second body are transformed from the retracting state to the spreading state, the driving member drives the shielding member sliding with respect to the sliding member to shield the part of the opening, wherein the driving member has a guiding pin, the shielding member has a sliding slot, and the guiding pin is slidably disposed in the sliding slot.

2. The handheld electronic device as claimed in claim 1, wherein the driving member comprises at least two driving members each having a guiding pin, the shielding member has a pair of sliding slots, and the guiding pins are slidably coupled to the sliding slots.

3. The handheld electronic device as claimed in claim 1, wherein the driving member has a first end and a second end, the first end is pivoted on the sliding member along a first axis, the second end is pivoted on the fixing member along a second axis, the driving member has a guiding pin, the shielding member has a sliding slot, the guiding pin is slidably disposed in the sliding slot, and a projection of the guiding pin perpendicularly projected to a straight line passing through the first axis and the second axis is situated between the first axis and the second axis.

4. The handheld electronic device as claimed in claim 1, further comprising:
a flexible electrical connecting member, passing through the opening and connected between the first body and the second body.

5. The handheld electronic device as claimed in claim 4, wherein the flexible electrical connecting member comprises a flexible printed circuit board.

6. The handheld electronic device as claimed in claim 1, wherein the first body comprises a display interface.

7. The handheld electronic device as claimed in claim 1, wherein the second body comprises an input interface, when the first body and the second body are configured in the retracting state, the input interface is covered by the first body, and when the first body and the second body are configured in the spreading state, the input interface is exposed outside the first body and the second body.

8. The handheld electronic device as claimed in claim 1, wherein the fixing member has a pair of sliding slots, and two opposite edges of the sliding member are slidably disposed in the pair of sliding slots.

\* \* \* \* \*